J. M. PALMER.
TOOL HOLDING APPLIANCE.
APPLICATION FILED JULY 16, 1906.
1,041,153.
Patented Oct. 15, 1912.
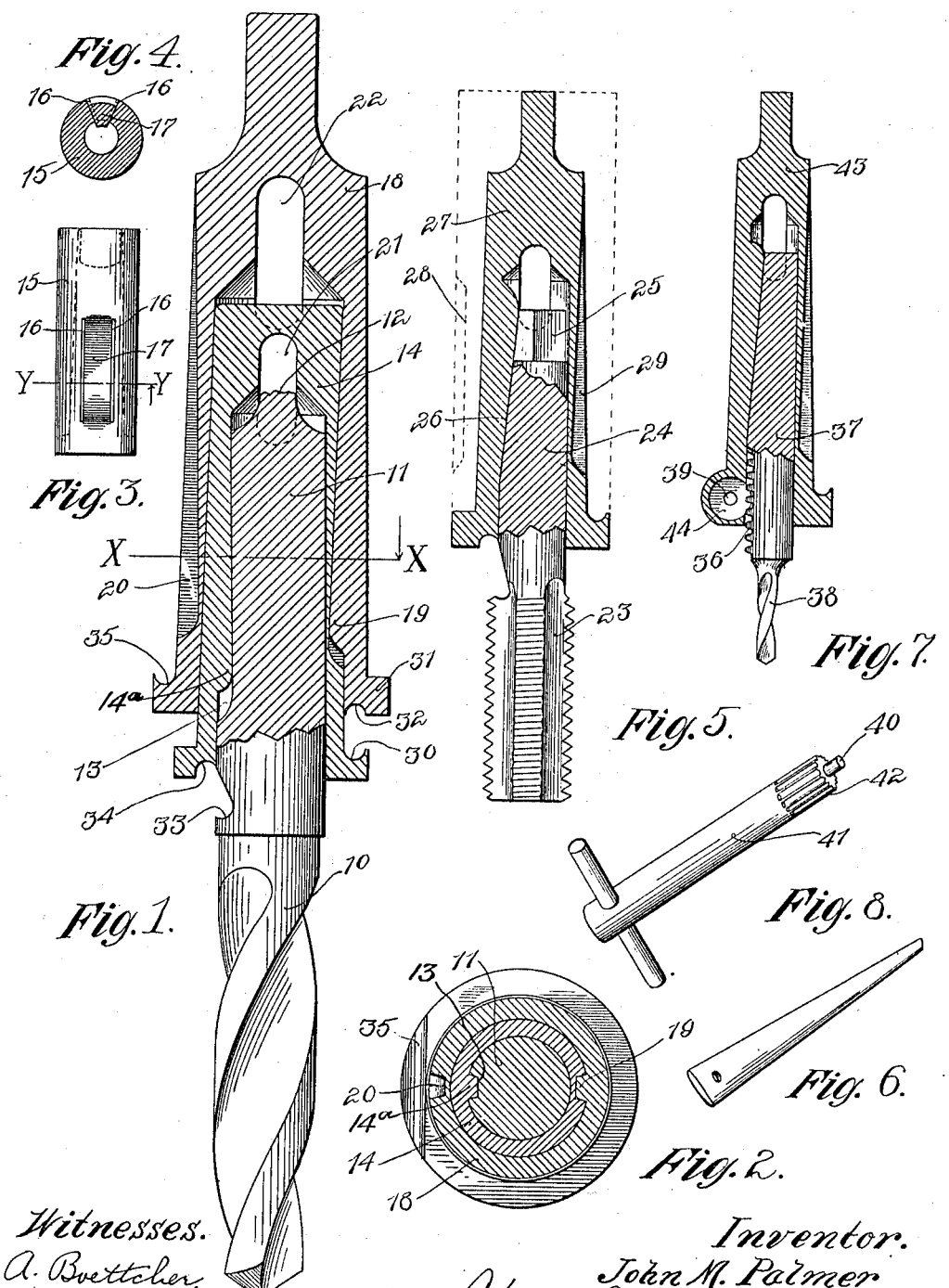
Witnesses.
A. Boettcher
George C. Higham
Inventor.
John M. Palmer
By Charles A. Brown
Atty.

UNITED STATES PATENT OFFICE.

JOHN M. PALMER, OF CHICAGO HEIGHTS, ILLINOIS, ASSIGNOR TO UNIVERSAL TOOL COMPANY, OF CHICAGO, ILLINOIS, A CORPORATION OF ILLINOIS.

TOOL-HOLDING APPLIANCE.

1,041,153.  Specification of Letters Patent.  Patented Oct. 15, 1912.

Application filed July 16, 1906. Serial No. 326,338.

*To all whom it may concern:*

Be it known that I, JOHN M. PALMER, citizen of the United States, residing at Chicago Heights, in the county of Cook and State of Illinois, have invented a certain new and useful Improvement in Tool-Holding Appliances, of which the following is a full, clear, concise, and exact description, reference being had to the accompanying drawings, forming a part of this specification.

My invention relates to tool holding and driving appliances, and contemplates a new system of interchangeable shanks and sockets for drills, taps and other rotating tools, and the spindles and other holding devices by which such tools are driven.

At the present time it is the common practice to provide twist drills and other tools with a taper shank, the shanks being formed in accordance with a series of standard sizes and tapers. Lathe spindles and the spindles of drill presses and other machine tools are bored with a taper hole of some one of these standard sizes. A drill which is of large size may be provided with a taper shank which exactly fits the taper socket of the machine tool. A smaller drill will have a taper shank of smaller size, and in order to drive such a small drill by the spindle of the machine tool, it is necessary to insert a bushing or sleeve between the drill and the socket of the spindle of the machine tool. Sometimes it is necessary to insert a number of sleeves in order to drive a small tool by the spindle of a large machine tool. In order to prevent the tool which is being driven from slipping in the driving socket, it has been the custom to provide each taper shank of a tool or driving sleeve with a tang which projects into an opening of corresponding size and shape at the end of the driving sleeves or sockets. This flattened tang serves to drive the drill or other tool, while the taper shank serves to center and aline the tool and to hold it firmly in the socket. In order to remove such tools from their sleeves or sockets it is necessary to drive a tapered drift pin through an opening in the socket just above the end of the tang of the tool. When it is necessary to use a number of sleeves of increasing size in order to properly bush a tool for use in the spindle of a machine tool, it is necessary first to remove the sleeve of larger size, together with all those of smaller size, by driving the drift pin through the opening in the spindle of the machine tool, in order to get at the drill whose shank fits the sleeve of smallest size. It is then necessary to remove each of the sleeves of larger size in turn by driving a drift pin through the opening in each sleeve. Thus, when occasion requires that one small drill shall be replaced by another, it is necessary to remove all of the sleeves one by one, and then to replace them one by one upon the shank of the new drill. Another difficulty which is encountered in this system of driving is that the tangs are frequently twisted out of shape, and, in fact, are often torn entirely from the end of the tool shank or sleeve. This, of course, destroys the utility of the tool or sleeve. Another method in common use at the present time is to provide the drills, taps or other tools with straight cylindrical shanks. In order to drive such a tool it is necessary to grip the shank in a chuck or to insert the shank in a cylindrical socket, where it must be gripped by a set screw or equivalent means, in order that the spindle may drive the tool. The result of this process is that the driving shanks are frequently torn and damaged by slipping in the chuck or spindle, thus preventing them from accurate alinement with the driving spindle. Furthermore, it is difficult by this means to hold a tool tightly enough to prevent its slipping in the spindle.

My invention provides for a new system of driving, whereby the difficulties referred to are overcome.

In applying my invention to a system of taper holding and driving devices, the customary tang may be dispensed with entirely, although my invention may be used with tools which have also the tang which is now in common use. The taper shank of each tool or driving sleeve is formed with a suitable keyway, preferably of more or less V-shaped cross-section and preferably increasing in depth toward the larger end of the taper shank, corresponding with the keyways formed in the shanks of the tools and driving sleeves. The socket of each driving sleeve and spindle is provided with an inwardly projecting key. A driving sleeve, for example, is provided with a feather-like key extending into the socket from one side, while diametrically opposite a keyway is cut into the shank of the sleeve from the outside.

My invention contemplates a novel and advantageous method of forming the depressed keys within the sockets of sleeves or spindles.

My invention, when applied to straight shank tools and sockets, contemplates the provision of a keyway in each shank, together with a corresponding depressed key in each socket, the depth of the key and keyway being decreased toward the working end of the tool, so that the key and keyway serve not only to drive the tool but also to wedge and grip the shank within the socket of a driving sleeve or spindle in a manner somewhat similar to that in which the taper shank of a tool is gripped in a taper socket.

Another feature of my invention consists in the novel and advantageous means by which the tools, sleeves and spindles are separated from one another.

All of these features will be more fully explained in connection with the accompanying drawing, in which—

Figure 1 illustrates in elevation a drill and a series of driving sleeves embodying my invention, part of this figure being in cross-section the more clearly to indicate the construction shown; Fig. 2 is a cross-sectional view taken on line $x$—$x$ of Fig. 1; Fig. 3 illustrates a preferred method of forming a driving sleeve; Fig. 4 is a cross-sectional view taken on line $y$—$y$ of Fig. 3; Fig. 5 is a view partly in elevation and partly in cross-section, showing the application of my invention to tools and sleeves employing the straight cylindrical system of shanks and sockets; Fig. 6 illustrates a drift pin adapted for use in conjunction with the system of my invention; Fig. 7 is a view illustrating a modification of the means provided for separating tools and sleeves, and Fig. 8 illustrates in perspective a pinion wrench intended for use in connection with this modified form of separating means.

In all of the figures similar characters of reference apply to corresponding parts.

Referring to Fig. 1, I have shown a twist drill 10, having a taper shank 11. In this view I have shown a drill whose tang has been broken off at 12, and this figure will illustrate, therefore, the use of my invention in connection with tools whose tangs have been broken off in service. A keyway is cut into the taper shank at 13. It is to be noted that in this embodiment of my invention, the depth of the keyway in the shank of the drill is increased from nothing at the small end of the taper shank to a maximum depth near the large end of the shank. I prefer to make the depth of the keyway increase at the same rate as the increase in the diameter of the taper shank itself. Thus it is that the bottom of the keyway is parallel with the element along the diametrically opposite side of the taper shank, as illustrated in Fig. 1. The keyway is preferably of more or less V-shaped cross-section, as best illustrated in Fig. 2. I prefer, however, not to bring the sides of the keyway to a sharp angle at the bottom. The taper shank of the drill 10 is inserted within the socket of the sleeve 14, as illustrated in Fig. 1. This socket is, of course, tapered to fit the shank of the drill, and is provided with a depressed key or feather $14^a$ extending into the socket and registering with the keyway cut in the drill shank.

I prefer to form a driving sleeve in the following manner: A piece of stock 15 is bored with a taper hole corresponding with the taper shank of the tool which the sleeve is to fit. The stock is then slitted at 16, 16, these slits being cut, for example, in a milling machine converging toward the interior of the sleeve, as best indicated by the dotted lines in Fig. 4. A hardened and ground master shank, having formed within it the required keyway, is then inserted tightly within the taper hole of the stock, the keyway being brought into register with the piece of metal lying between the slits 16, 16. This stock having been heated to a suitable temperature, the metal between the slits is forced inwardly. The keyway in the master shank gives to the depressed key the proper size and shape, while the force applied from the exterior drives the metal strip 17 inwardly until it comes into contact with the outer sides of the slits, as best shown in Fig. 4. After the depressed key has thus been formed on the interior of a sleeve or spindle, the outside of the sleeve is turned or otherwise finished to bring the outside of the sleeve to the form of a taper shank of a larger size, the outside of this sleeve being adapted to fit into the socket of a larger sleeve or spindle. The finishing of the outside of the sleeve removes the metal down to the dotted lines in Fig. 3, and thus the finished sleeve has no depression upon its outer surface where the strip 17 has been depressed, and since the strip 17 is driven inwardly until it fits tightly against the outer sides of the slits 16, the sleeve may be finished on the outside to a smooth, unbroken surface, just as though the slitted strip had not been depressed to form the internal key or feather. After the depressed key has been formed on the inside of the sleeve, a suitable keyway may be milled or otherwise cut in the outside of the sleeve. The bottom of this keyway, as in the case of the drill, is preferably parallel with the element on the diametrically opposite side of the shank of the sleeve. This keyway, like that in the shank of the drill, does not extend quite to the smaller end of the tapered shank of the sleeve. The keyway in the shank of the sleeve is preferably placed diametrically opposite the internally depressed key of the same sleeve. Fig. 1 shows not only the sleeve 14 but a still larger sleeve 18, into which the smaller sleeve is fitted and which in turn will fit within a sleeve having a still larger socket or within the taper spindle of a drill press or other machine tool. This largest sleeve is provided with the depressed key at 19 and a properly formed keyway at 20. All of the keys and keyways are illustrated in cross-section in Fig. 2. The two sleeves shown in Fig. 1 are provided with the usual openings at 21 and 22 to accommodate the use of the ordinary drift in separating these sleeves from each other or the tools held within them. This feature, like the tangs, may or may not be provided, as desired.

The advantages of the construction thus far described reside in the fact that the driving of the tool does not depend upon the strength of the tang, but rather upon the key and keyway. The alinement of the tool depends upon the taper shank and socket. By the use of these features of my invention it is unnecessary to provide tools or sleeves with tangs. By making the depressed key of V-shaped cross-section, it is possible to manufacture the sleeve cheaply and at the same time secure a strong, solid construction, and this, too, without precluding a smooth and perfect exterior surface for the sleeve. To insert the drill 10 within the sleeve 14, the upper end of the drill is placed in the lower end of the sleeve and pressed upward, until the top of the drill comes into contact with the lower end of the depressed key. The drill is then turned by hand relative to the sleeve until the lower end of the depressed key registers with the upper end of the keyway cut in the drill shank. The drill can then be forced home, and during its movement into the sleeve the key is sunk deeper and deeper into the keyway, thus maintaining the alinement of the parts, and as the sides of the key make contact with the adjacent sides of the keyway the proper register of the parts is insured.

In Fig. 5 I have illustrated the preferred form of my invention where it is applied to straight shank tools and sockets. In this figure I have illustrated a bottoming tap 23, this tap being provided with a straight cylindrical shank 24, the shank being milled down to a square head 25 for the use of a tap wrench when desired. Into one side of the shank a keyway of V-shaped cross-section is cut at 26, this keyway being increased in depth toward the top of the shank of the tool. The sleeve 27 is provided with a depressed key adapted to register with the keyway cut in the tool shank. This key may be formed in the manner previously described except that the master shank which is inserted in the sleeve should have the straight cylindrical contour with the tapering keyway, as illustrated in Fig. 5. The dotted lines in Fig. 5 illustrate the stock from which the sleeve 27 is cut, the dotted line 28 indicating the strip of metal which has been driven inwardly to form the depressed key. The outside of the sleeve 27 is provided with a keyway 29, like those shown in Fig. 1. The sleeve 27 can be fitted into the sleeve 14 in place of the drill shank 11. In this modification of my invention the key and keyway serve a double purpose, first, that of driving the drill and absolutely preventing it from slipping within the sleve 27, and, second, that of holding the tool within the sleeve 27. Thus, for example, if the sleeve be inserted in the vertical spindle of a drill press, the tap can be forced up into the socket of the sleeve until the tool shank is wedged between the side of the socket and the converging bottom of the key. By raising the tap suddenly into position within the sleeve, it will hold itself and will not drop from the end of the spindle of the drill press, as it would if it were not for the converging key and keyway. The keyway cut in the straight shank of a tool does not interfere with the use of this tool in a chuck or in a sleeve or spindle having a set screw for clamping the tool. Nor do the keys and keyways of my invention interfere with the use of the ordinary tangs or square heads for tap wrenches and the like. The keyways required in the system of my invention can be milled in the shanks of drills, taps or other tools as now manufactured, thus simplifying the use of my invention in connection with tools of the prior art already in use.

While in Figs. 5 and 7 I have illustrated straight shank tools in the sockets of taper shank sleeves, it will be understood that the shanks of the sleeves may also be straight, while, if desired, their sockets may be tapered.

Another feature of my invention consists in the means by which the sleeves and tools are separated from each other. It will be noted that each of the sleeves is provided at its larger end with a flange. In a tangential direction across the upper face of each flange a groove is cut, as at 30, to form a projecting ledge or lip on the sleeve 14 as shown in Fig. 1. On the lower side of the flange 31 of the sleeve 18 another groove is cut to form an overhanging lip. These two grooves are so placed relatively to the position of the associated keys and keyways that they will always come into position one above the other. By driving the drift pin shown in Fig. 6 into the space between the grooves 30 and 32 the sleeves 14 and 18 are forced apart. A groove 33 is milled through one side of the lower end of the shank of the drill 10, so that a drift pin can be driven into the space between the grooves 33 and 34 to force the drill from the sleeve 14. Upon the upper side of the flange 31 a groove 35 is cut and a corresponding groove provided upon the next larger sleeve or spindle permits a drift pin to be used to withdraw the sleeve 18 from the sleeve or spindle in which it may be used. It is to be noted that by the use of these exposed flanges and grooves any two sleeves or tools or spindles may be separated without interfering in any way with the connection between the others which may have been used for bushing purposes. In carrying out the system of my invention, I have found it desirable to cut the upper groove on the same side of a shank as is the keyway in that shank, the groove on the under side of the flange being cut at a point diametrically opposite. The tool shanks may be provided with flanges in which the ledges are formed in the same manner as that illustrated in connection with the sleeves.

In Fig. 7 I have illustrated a modification of the means for separating tools and sleeves, this modification consisting in a rack 36, milled on one side of the shank 37 of the tool 38 and a bearing 39 into which the pin 40 of the pinion wrench 41 may be inserted to bring the teeth of the pinion 42 into engagement with the teeth of the rack 36. The lower end of the sleeve 43 is provided with a receptacle 44, which guides and supports the end of the pinion wrench while in use. It will be apparent to those skilled in the art that by turning the wrench the pinion engages the rack to withdraw the shank 37 from the sleeve 43. In this Fig. 7 I have shown a straight shank tool with a taper key and keyway like that illustrated in Fig. 5, and in this case the pinion wrench may be used to force the tool shank into the sleeve as well as to withdraw it from the sleeve. This means of separating tools and sleeves may be applied to taper shank tools as well as to straight shank tools. As in Fig. 7, a sleeve may be equipped with a receptacle for the pinion wrench for withdrawing the shanks of tools, while it may be equipped also with a flange upon which a groove or grooves are cut for use in connection with a drift pin in separating, as already described. So also either one or both of these methods of separation may be dispensed with entirely or may be combined with the openings and tangs now commonly in use for the separation of appliances of the character to which my invention relates.

While I have herein shown and described the preferred embodiments of my invention and certain modifications thereof, it will be apparent to those skilled in the art that many other modifications and changes may be made without departing from the spirit of my invention; but Having shown and described my invention, I claim as new and desire to secure by Letters Patent:

1. In combination, a sleeve having a socket adapted to fit a tool shank, and a key extending into the socket of the sleeve and adapted to register with a corresponding keyway formed in such shank, the depth of said key being increased toward the receiving end of said socket.

2. In combination, a sleeve having a socket adapted to fit a tool shank, and a key extending longitudinally of and inwardly from said sleeve and adapted to register with a corresponding keyway formed in such shank, the depth of said key being increased toward the receiving end of said socket.

3. In combination, a driving sleeve having a socket adapted to fit a tool shank and a key extending into the socket of the sleeve adapted to register with a corresponding keyway formed in such shank, the depth of said key being increased toward the receiving end of the said socket.

4. In combination, a sleeve having a socket adapted to fit a tool shank, and a key extending into the socket of the sleeve and adapted to register with a corresponding keyway formed in such shank, the top surface of said key and the bottom of said keyway being in engagement throughout the entire length thereof and the depth of said key being increased toward the receiving end of said socket.

5. In combination, a sleeve having a socket adapted to fit a tool shank, and a key extending into the socket of the sleeve and adapted to register with a corresponding keyway formed in such shank, the depth of said key being increased toward the receiving end of said socket and the upper surface of said key being parallel to the diametrically opposite inside element of the sleeve.

6. In combination, a sleeve having a socket adapted to fit a tool shank, and a key extending into the socket of the sleeve and adapted to register with a corresponding keyway formed in such shank, said key being of V-shaped cross-section and the depth of said key being increased toward the receiving end of said socket.

7. In combination, a sleeve having a socket adapted to fit a second sleeve, and a key extending into the socket of said first sleeve and adapted to register with a corresponding keyway formed in such second sleeve, the depth of said key being increased toward the receiving end of said socket.

8. In combination, a sleeve having a socket adapted to fit a second sleeve, a key extending into the socket of said first sleeve and adapted to register with a corresponding keyway formed in such second sleeve, said second sleeve having a socket adapted to fit a tool shank and a key extending into the socket of the sleeve and adapted to register with a corresponding keyway formed in such shank, the depth of said keys being increased toward the receiving ends of said sockets and said keys being arranged diametrically opposite each other.

In witness whereof, I hereunto subscribe my name this 10th day of July A. D., 1906.

JOHN M. PALMER.

Witnesses:
 LYNN A. WILLIAMS,
 HARVEY L. HANSON.

Copies of this patent may be obtained for five cents each, by addressing the "Commissioner of Patents, Washington, D. C."